United States Patent
Fan et al.

(10) Patent No.: US 7,822,290 B2
(45) Date of Patent: Oct. 26, 2010

(54) SYSTEM AND METHOD FOR PROCESSING IMAGES WITH LEAKY WINDOWS

(75) Inventors: Zhigang Fan, Webster, NY (US); Stuart Schweid, Pittsford, NY (US); Jeng-nan Shiau, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 936 days.

(21) Appl. No.: 11/116,861

(22) Filed: Apr. 28, 2005

(65) Prior Publication Data

US 2006/0245648 A1 Nov. 2, 2006

(51) Int. Cl.
*G06K 9/36* (2006.01)
*G09G 5/00* (2006.01)
(52) U.S. Cl. ...................... 382/284; 345/629
(58) Field of Classification Search ........... 382/284
See application file for complete search history.

(56) References Cited

U.S. PATENT DOCUMENTS

| | | | |
|---|---|---|---|
| 6,240,205 B1 | 5/2001 | Fan et al. | |
| 6,778,698 B1* | 8/2004 | Prakash et al. | 382/164 |
| 6,985,628 B2* | 1/2006 | Fan | 382/224 |
| 6,987,875 B1* | 1/2006 | Wallack | 382/146 |
| 7,346,224 B2* | 3/2008 | Kong et al. | 382/261 |
| 2004/0230930 A1* | 11/2004 | Lippincott et al. | 716/8 |
| 2006/0001690 A1* | 1/2006 | Martinez et al. | 347/19 |

OTHER PUBLICATIONS

Chen-Chau Chu; Aggarwal, J.K., "The integration of image segmentation maps using region and edge information," Pattern Analysis and Machine Intelligence, IEEE Transactions on , vol. 15, No. 12, pp. 1241-1252, Dec. 1993.*

\* cited by examiner

*Primary Examiner*—Bhavesh M Mehta
*Assistant Examiner*—Hadi Akhavannik
(74) *Attorney, Agent, or Firm*—Duane C. Basch; Basch & Nickerson LLP

(57) ABSTRACT

Disclosed is a method and system for processing image data, which may be generated by a scanning subsystem, and the segmentation and treatment of leaky windows or segments within the image. In addition to the identification of window regions or segments having leaky boundaries, the method and system include the subsequent control of enhancement and other image processing techniques applied to such images so as to reduce or eliminate artifacts that result from the processing of leaky window regions.

19 Claims, 5 Drawing Sheets

SYSTEM AND METHOD FOR PROCESSING IMAGES WITH LEAKY WINDOWS

The system and method disclosed herein are directed to the processing of image data for images having leaky boundaries for regions or windows therein, and more particularly to the identification of window regions having leaky boundaries and the subsequent control of enhancement and other image processing techniques applied to such images.

BACKGROUND AND SUMMARY

Automated windowing and application of image processing techniques to input images, particularly scanned images, is to a certain extent known. However, it is also known that the automated application of image processing and enhancement to documents often results in undesireable image artifacts. In many cases, these artifacts are detectable by a viewer of the resulting or printed image.

As indicated by U.S. Pat. No. 6,240,245 to Fan et al., issued May 29, 2001, hereby incorporated by reference in its entirety, it is known in the art to take a page of image data and to separate the image data into windows of similar image types. For instance, a page of image data may include a halftone picture(s) with accompanying text describing or related to the picture. In order to efficiently process the image data, it is known to separate the page of image data into at least two windows, a first window representing the halftone image, and a second window representing the text. It is also possible, as will be described herein, to treat text as part of the image or document "background" and to characterize halftones, graphics, line art, etc. as bounded by a window or window boundary.

Processing of the page of image data can then be efficiently carried out by tailoring the processing to the type of image data being processed. In other words, in automatically processing of the page, it is likely to be desireable to process the windowed halftone and other non-background portions of an image in a manner different from the background. In such systems, the image processing techniques are frequently applied, or at least suggested, automatically to enhance the image for its ultimate rendering or display. The various image processing operations that can be carried out include, but are not limited to filtering, compression, color and tonal reproduction curve (TRC) correction, enhancement (edge) and adjustment, and halftoning. As will be appreciated, such processing may also be carried on with specific windows or regions, or the parameters of such processing may be altered from one window to another.

One aspect of the disclosed system and method deals with a basic problem in automated image processing—that of improperly segmenting or windowing the image and as a result producing artifacts or other undesireable changes in portions of the image. This aspect is further based on the discovery of a technique that alleviates this problem. The technique is applied to a segmented or windowed image, and seeks to determine whether the window boundaries are leaky. As used herein the term "leaky" is intended to characterize the nature or quality of an identified window or window boundary within a segmented image. Leaky implies that the boundary is, at least to a certain extent, indefinable or indeterminate. In such situations, as will be described with examples set forth below, the desired location of a boundary that separates the background from an enclosed graphic, halftone, etc. is not completely determinable. One example of where such a situation might occur is where a "bleeding" transition has been employed (i.e., where the graphic or image fades into the background), such as depicted in the exemplary image of FIG. 4. The disclosed system and method address such problems by seeking to determine if window boundaries are leaky, and if so, to compensate for the leaky boundaries in any image enhancement or processing that is done.

Disclosed in embodiments herein is a window segmentation method for classifying data defining an image into background and at least one non-background region, comprising: evaluating the data defining the image and segmenting the image into at least one background region and a non-background region, wherein said non-background region is bounded by a window having a boundary; and determining whether said window boundary is a leaky boundary Disclosed in further embodiments herein is a window segmentation method for classifying data defining an image into background and at least one non-background region, comprising: evaluating the data defining the image and segmenting the image into at least one background region and a non-background region, wherein said non-background region is bounded by a window having a boundary; and determining whether said window boundary is a leaky boundary, wherein determining whether said window boundary is a leaky boundary comprises, performing edge detection along the window boundary to determine the presence or absence of an edge, comparing the length of any portion of the window boundary in which an edge is not detected, and in the event that the length of any missing edge portion exceeds a threshold, characterizing the window boundary as a leaky boundary.

Also disclosed in embodiments herein is an image processing system, comprising: memory for storing digital image data; a processor, connected to said memory, for evaluating the digital image data and segmenting the image into at least one background region and a non-background region, wherein said non-background region is bounded by a window having a boundary, determining whether said window boundary is a leaky boundary, and enhancing the image data as a function of the type of window boundary determined to be present in the image; and an output engine for rendering an enhanced image.

Figure 1:
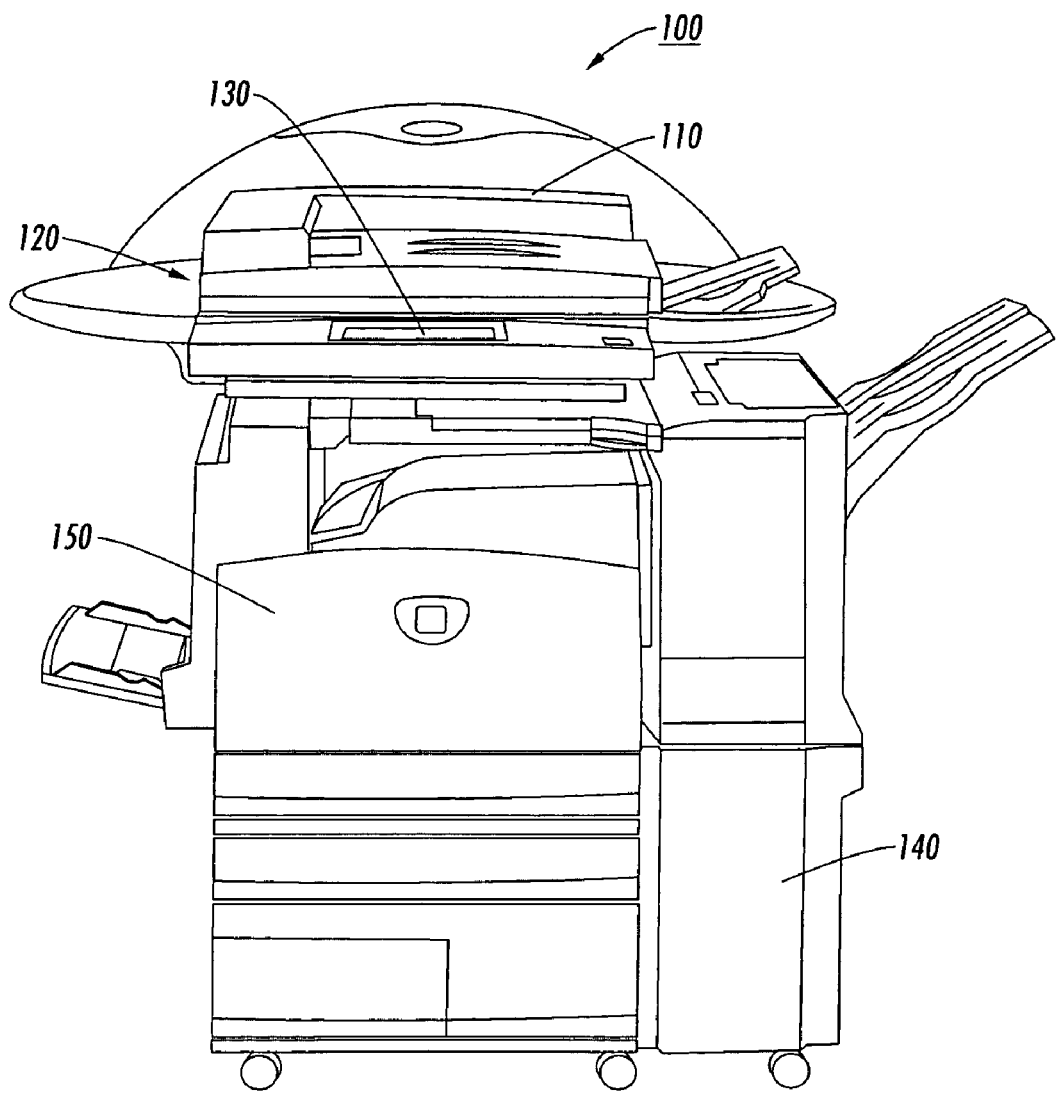
FIG. 1 is a front elevation view of a multi-function digital reprographic device that provides an exemplary embodiment for aspects of the disclosed system and method.

The system and methods will be described in connection with a preferred embodiment(s), however, it will be understood that there is no intent to limit the scope of the appended claims to the embodiment described. On the contrary, the intent is to cover all alternatives, modifications, and equivalents as may be included within the spirit and scope of the invention as defined by the appended claims.

DETAILED DESCRIPTION

For a general understanding of the present disclosure, reference is made to the drawings. In the drawings, like reference numerals have been used throughout to designate identical elements.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium. A "storage medium access device" is a device that includes circuitry that can access data on a data storage medium. Examples include drives for reading magnetic and optical data storage media.

"Memory circuitry" or "memory" is any circuitry or data storage medium that can store data, and may include local and remote memory and input/output devices. Examples include semiconductor ROMs, RAMs, and storage medium access devices with data storage media that they can access.

Figure 2:
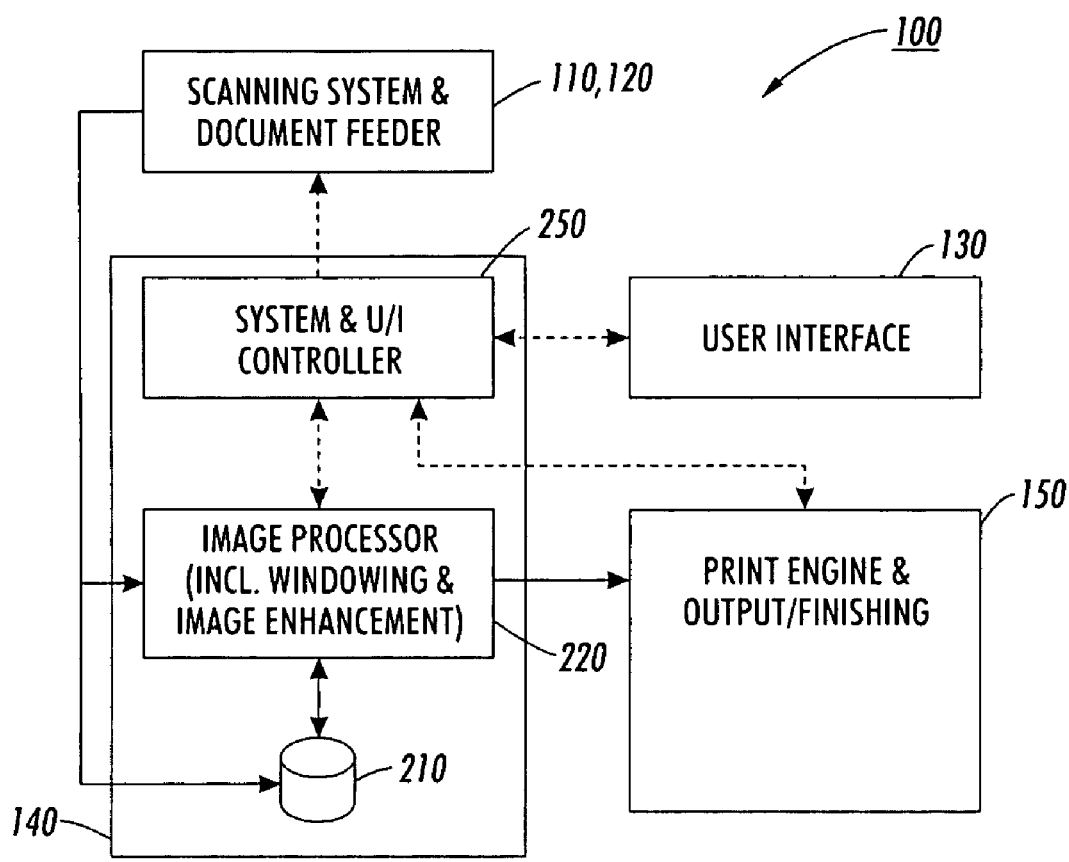
FIG. 2 is a schematic block diagram of the exemplary embodiment of FIG. 1.

Referring now to FIGS. 1 and 2 there are shown alternative views of a multi-function digital reprographic device 100 that provides an exemplary embodiment for aspects of the disclosed system and method in particular device 100, for example the Xerox® DocuColor 3535 Printer Copier, is capable of providing multi-function document scanning, storage and printing functions. In one embodiment device 100 includes a scanning system 120 and an associated document feeder 130, suitable for feeding a plurality of hard copy documents to and through the scanning system. Output of the scanning system, in the form of digital image data (e.g., rasterized data) is generated by the scanning system and input to the device control circuitry 140 for processing and/or storage.

Once processed, the image data may be output from the system, either in the form of processed image data, or in the form of a hard copy rendering of the data on a substrate. Rendering in hard copy form is accomplished by passing the image data to a printing or output engine 150, that prints the black and white or color document using one of several known printing methods.

As more specifically illustrated in FIG. 2, the control circuitry will include, among other subsystems, a system and user interface control circuit 250 including a processor (e.g., Pentium) and associated program memory indicating the control processes to be executed. Linked to the system controller 250 is an image processing system 220, that is, in one embodiment, an Electronics for Imaging, Inc. (EFI) Controller linked to the print engine 150. The EFI controller is a component within the 850 MHz Intel Pentium III computing platform, where the platform includes at least 256 MB printing memory, and a 20 GB Hard drive 210 suitable for storing PostScript Level 3 output produced by the system. The platform is also preferably linked to an external network by a 10/100 Base T Ethernet connection.

As will be appreciated, the various features and functionality of the device 100 are enabled by computer software and various computing algorithms. In particular, as illustrated in FIGS. 1 and 2, the system controller 250 includes programmatic memory that will produce the various user interface screens and menus that guide a user through the scan/print job process and provide job status to the user via user interface 130. In other words, device 100 further includes a user interface whereby a user can make a plurality of selections relative to the operation of the image processing system. In accordance with one aspect, at least one of such selections controls the processing of the system relative to any leaky window boundary identified in image data to be enhanced.

Similarly, the system and user interface control circuit 250 controls operation of the image processor 220 so as to operate the subsystems and perform the scanning (110, 120), processing (220) and output (150) functions described below. More specifically, and referring briefly to FIGS. 4 and 5, processor 220 is connected to memory (e.g., magnetic disk 210), for evaluating the digital image data produced by scanner 120 and segmenting the image data (e.g. 410) into at least a background region and a non-background region. The non-background region is bounded by a window having a boundary (470), determining whether said window boundary is a leaky boundary, and enhancing at least a portion of the image data as a function of the type of window boundary determined to be present in the image.

Figure 3:
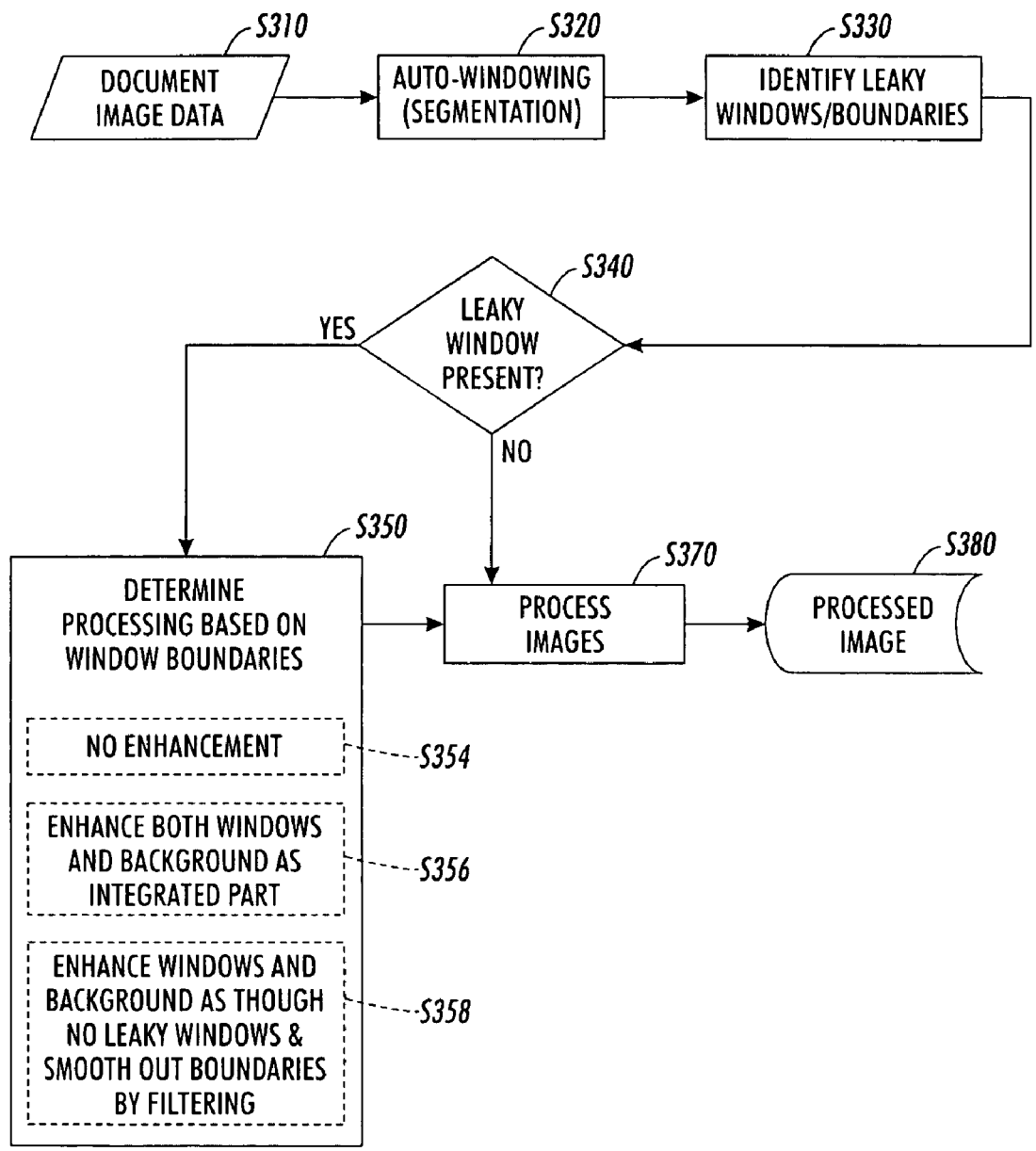
FIG. 3 is a flow diagram depicting a method disclosed herein.

Having described an exemplary system, reference is now made to FIG. 3, which is a flow diagram depicting methods disclosed herein in more detail. In particular, FIG. 3 illustrates a window segmentation method for classifying data defining an image into background and at least one non-background region. The methods includes acquiring document image data (S310), which may be accomplished by a scanning or image acquisition system as described herein. Alternatively, the image may be retrieved from storage or received via a network connection. Once the input image is received, evaluating the data defining the image and segmenting the image into at least one background region and a non-background region (S320), wherein said non-background region is bounded by a window having a boundary, may be accomplished (S330). It will be appreciated that various methods of image analysis may be employed to achieve the segmentation (windowing) of the image data and that the embodiment(s) described are not limited to particular image segmentation methods. For example, the method described by Fan et al. in U.S. Pat. No. 6,240,205 issued May 29, 2001, is one such method, where a macro-detection step for examining a scanline of image data includes the steps of separating a scanline into edge portions and image runs and classifying each of the image runs based on statistics for the image data within each image run. The macro-detection step could also include clean up steps wherein each of the edge sections of the scanline are also classified based on 1) the image data of the edge sections, and 2) the classification of surrounding image runs. The clean up steps might also include reclassifying image runs based on the classification of surrounding image runs.

Next, the method may further include determining whether the window boundary is a leaky boundary as will now be described (S340). Determining whether the window boundary identified in S330 is a leaky boundary includes, in one embodiment, (i) performing edge detection along the window boundary to determine the presence or absence of an edge, (ii) comparing the length of any portion of the window boundary in which an edge is not detected against a threshold, and (iii) in the event that the length of any missing edge portion exceeds the threshold, characterizing the window boundary as a leaky boundary. It will be appreciated that threshold may be a function of the image resolution and an overall length of the window boundary.

As an alternative to the method above, S330-S340 may include (i) performing edge detection along the window boundary to determine a relative strength of the edge at a plurality of positions therealong and (ii) for each position, characterizing the strength as strong or weak. Then, (iii) determining the ratio of strong to weak edge positions along the window boundary, and (iv) in the event that the ratio of strong to weak edge positions is less than a predetermined threshold, characterizing the window boundary as a leaky boundary. It will be appreciated that the threshold employed for such an analysis may be a variable defined in accordance with a pre-set level, or may be varied in accordance with the type or nature of the image being analyzed. One threshold that may be employed, for example, is a 3-to-1 ratio or 75% threshold where at least three-quarters of the edge positions must be characterized as strong.

Once the presence of leaky windows is determined at S340, processing of the image continues at S370 where the nature of the processing is controlled by the presence or absence of leaky window boundaries. More specifically, where leaky window boundaries are identified, the various alternatives set forth in S350 include: (i) S354, where any enhancement operations for an image having a leaky window boundary are prevented; (ii) S356, where enhancement of both windows and background is accomplished as an integrated part; or (iii) S358, where the windows and background are processed as though no leaky window is present and the boundaries are smoothed out by appropriate filtering. For example, a low-pass filterer may be used to eliminate the window boundaries caused by applying different tone reproduction curves (TRCs).

Once the manner of processing the image with a leaky window(s) boundary(ies) is determined at S350, processing is completed at S370, and the processed image is generated at S380. It will be further appreciated that various type of processing may be accomplished at S370, including, but are not limited to image filtering, image compression, color and tonal reproduction curve (TRC) correction, image enhancement (e.g., edge) and adjustment, and image halftoning.

Figure 4:
FIGS. 4 and 5 are respective illustrations of examples of a document image in a pre-processed and semi-processed state in accordance with the disclosure herein.
Figure 5:
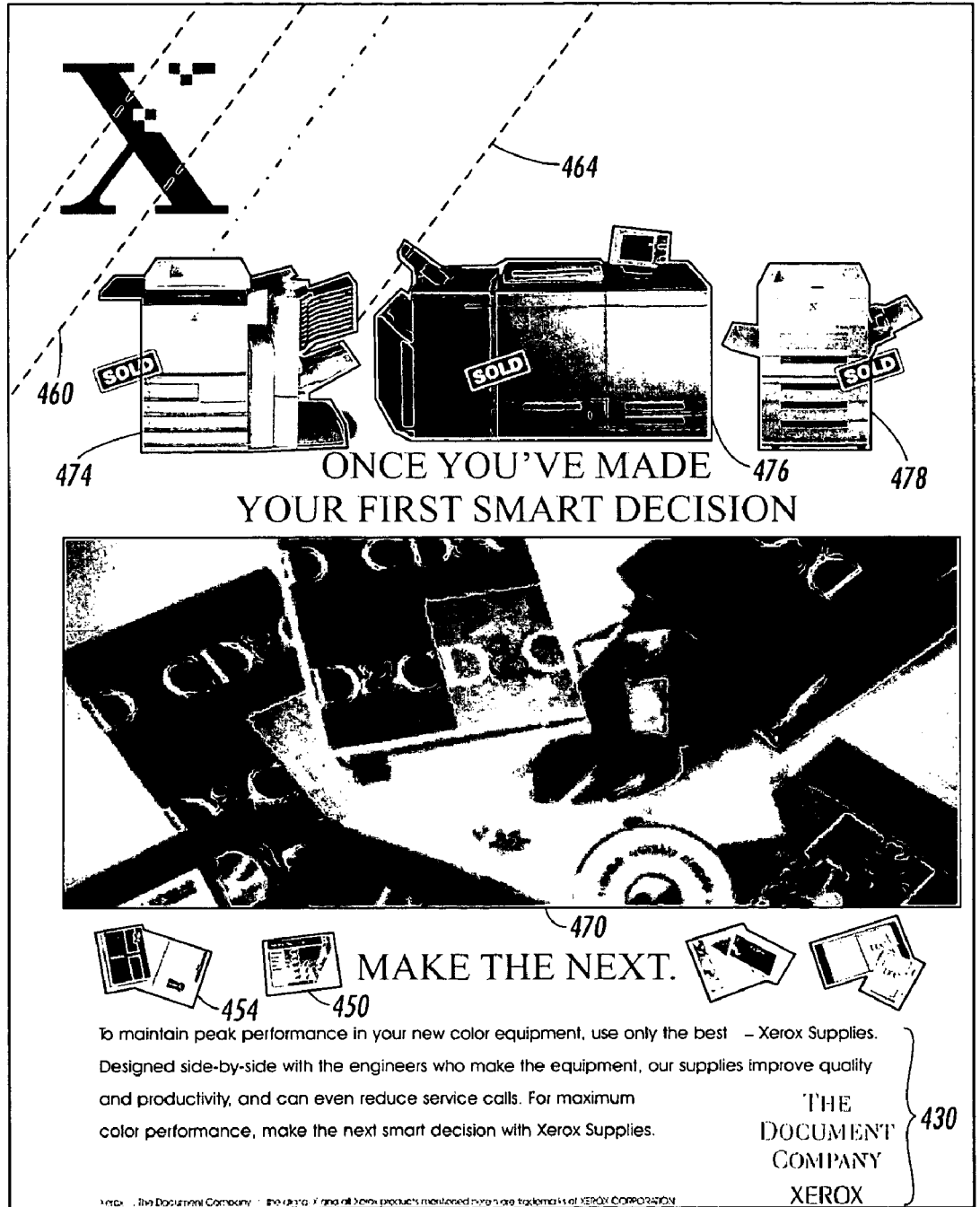

Having described exemplary systems and methods, attention is returned to FIGS. 4 and 5, which illustrate respective examples of a document image in a pre-processed and semi-processed state in accordance with the disclosure herein. As depicted in FIG. 4, image 410 includes not only a background having one or more regions of colored text 430 thereon, but it also includes embedded images (e.g., equipment, output examples) and graphics (angled bleeds in upper left). Once processed in accordance with certain steps described above, the image might be segmented into various windows or regions as depicted in FIG. 5. More specifically, the image 410 now has several of the graphic and embedded image regions set off with window boundaries. However, as will be appreciated, the boundaries around certain portions of the image (e.g., 450, 454, 470, 474, 476 and 478) may be more easily detected than the leaky boundaries around embedded graphics 460, 464 (e.g., the lower left bleeds). In other words, boundaries about regions 460 and 464 will likely result in a leaky window characterization due to the lack of defined or strong edges over at least a portion of the boundary.

In order to avoid the creation of artifacts in documents of the type illustrated, where the enhancement or processing of a scanned image may generate undersireable artifacts, it is important to adjust the processing according to the nature of the document—and the leakiness of the windows or segments identified. Accordingly, the window segmentation method should contemplate classifying data defining an image into background and at least one non-background region, and include the process previously described. For example evaluating the data defining the image and segmenting the image into at least one background region and a non-background region, wherein the non-background region is bounded by a window having a boundary, and then determining whether said window boundary is a leaky boundary, wherein determining whether said window boundary is a leaky boundary comprises, performing edge detection along the window boundary to determine the presence or absence of an edge, comparing the length of any portion of the window boundary in which an edge is not detected, and in the event that the length of any missing edge portion exceeds a threshold, characterizing the window boundary as a leaky boundary. Once identified, the image may be processed further in accordance with one of several alternatives to avoid or minimize the impact of the leaky windows.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A window segmentation method carried out by a processor for classifying data defining an image stored in memory operatively associated with the processor into background and at least one non-background region, comprising:

evaluating the data defining the image and segmenting the image stored in memory into at least one background region and a non-background region, wherein said non-background region is bounded by a window having a boundary; and determining whether said window boundary is a leaky boundary where the boundary is, at least to a certain extent, indeterminate including performing edge detection along the window boundary to determine a relative strength of the edge at a plurality of positions therealong;

for each position, characterizing the strength as strong or weak;

determining the ratio of strong to weak edge positions along the window boundary; and in the event that the ratio of strong to weak edge positions is less than 75%, characterizing the window boundary as a leaky boundary.

2. The method of claim 1, wherein determining whether said window boundary is a leaky boundary comprises:

performing edge detection along the window boundary to determine the presence or absence of an edge;

comparing the length of any portion of the window boundary in which an edge is not detected to a threshold; and in the event that the length of any missing edge portion exceeds the threshold, characterizing the window boundary as a leaky boundary.

3. The method of claim 2, wherein the threshold is a function of the image resolution and an overall length of the window boundary.

4. The method of claim 1, wherein determining whether said window boundary is a leaky boundary comprises:

performing edge detection along the window boundary to determine a relative strength of the edge at a plurality of positions therealong;

for each position, characterizing the strength as strong or weak;

determining the ratio of strong to weak edge positions along the window boundary; and in the event that the ratio of strong to weak edge positions is less than a predetermined threshold, characterizing the window boundary as a leaky boundary.

5. The method of claim 1, wherein determining whether said window boundary is a leaky boundary comprises:

performing edge detection along the window boundary to determine a relative strength of the edge at a plurality of positions therealong;

for each position, characterizing the strength as strong or weak;

determining the ratio of strong to weak edge positions along the window boundary; and in the event that the ratio of strong to weak edge positions is less than 75%, characterizing the window boundary as a leaky boundary.

6. The method of claim 1, further comprising preventing any enhancement operations for an image having a leaky window boundary.

7. The method of claim 1, further comprising enhancing both windows and background as an integrated part for an image having a leaky window boundary.

8. The method of claim 1, further comprising enhancing the windows and background as though no leaky window is present for an image having a leaky window boundary, while smoothing out the window boundary using a filtering operation.

9. A window segmentation method carried out by a processor for classifying data defining an image stored in memory operatively associated with the processor into background and at least one non-background region, comprising:

evaluating the data defining the image and segmenting the image stored in memory into at least one background region and a non-background region, wherein said non-background region is bounded by a window having a boundary; and determining whether said window boundary is a leaky boundary, where the boundary is, at least to a certain extent, indeterminate, including performing edge detection along the window boundary to determine a relative strength of the edge at a plurality of positions therealong;

for each position, characterizing the strength as strong or weak;

determining the ratio of strong to weak edge positions along the window boundary; and in the event that the ratio of strong to weak edge positions is less than 75%, characterizing the window boundary as a leaky boundary.

10. The method of claim 9, further comprising preventing any enhancement operations for an image having a leaky window boundary.

11. The method of claim 9, further comprising enhancing both windows and background as an integrated part for an image having a leaky window boundary.

12. The method of claim 9, further comprising enhancing the windows and background as though no leaky window is present for an image having a leaky window boundary, while smoothing out the window boundary using a filtering operation.

13. An image processing system, comprising:

memory for storing digital image data;

a processor, connected to said memory, for evaluating the digital image data and segmenting the image into at least one background region and a non-background region, wherein said non-background region is bounded by a window having a boundary, determining whether said window boundary is a leaky boundary, where the boundary is, at least to a certain extent, indeterminate, including performing edge detection along the window boundary to determine a relative strength of the edge at a plurality of positions therealong;

for each position, characterizing the strength as strong or weak;

determining the ratio of strong to weak edge positions along the window boundary;

in the event that the ratio of strong to weak edge positions is less than 75%, characterizing the window boundary as a leaky boundary; and enhancing the image data as a function of the type of window boundary determined to be present in the image; and an output engine for rendering an enhanced image.

14. The system of claim 13, further comprising an image input terminal.

15. The system of claim 14, further comprising a user interface whereby a user can make a plurality of selections relative to the operation of the image processing system, and wherein at least one of such selections controls the processing of the system relative to any leaky window boundary identified in image data to be enhanced.

16. The system of claim 15, wherein the memory is a magnetic recording media.

17. The system of claim 14, wherein said processor prevents any enhancement for an image having a leaky window boundary.

18. The system of claim 14, wherein said processor enhances both windows and background as an integrated part for an image having a leaky window boundary.

19. The system of claim 14, wherein said processor enhances the windows and background as though no leaky window is present for an image having a leaky window boundary, while smoothing out the window boundary by filtering.

* * * * *